July 18, 1961

H. KABELITZ 2,992,626

REGULATION OF NIPPING PRESSURE OF PRESSURE
ROLLERS IN IMPREGNATING MACHINES

Filed March 19, 1957

July 18, 1961  H. KABELITZ  2,992,626
REGULATION OF NIPPING PRESSURE OF PRESSURE
ROLLERS IN IMPREGNATING MACHINES
Filed March 19, 1957  3 Sheets-Sheet 2

July 18, 1961

H. KABELITZ 2,992,626

REGULATION OF NIPPING PRESSURE OF PRESSURE ROLLERS IN IMPREGNATING MACHINES

Filed March 19, 1957

United States Patent Office 2,992,626
Patented July 18, 1961

2,992,626
REGULATION OF NIPPING PRESSURE OF PRESSURE ROLLERS IN IMPREGNATING MACHINES
Hans Kabelitz, M. Gladbach, Germany, assignor to Gebrüder Sucker G.m.b.H., M. Gladbach, Rhineland, Germany, a corporation of Germany
Filed Mar. 19, 1957, Ser. No. 647,147
Claims priority, application Germany Mar. 22, 1956
14 Claims. (Cl. 118—11)

The present invention relates to machines for treating sheet material. It particularly relates to a method and apparatus for controlling or regulating the nipping pressure of the pressure rollers in impregnating devices, particulaly for use in sizing machines such as those disclosed in my copending application Serial No. 486,653, filed February 7, 1955, now Patent 2,900,951.

The pressure between two rollers which squeeze the excess of impregnating medium out of an impregnated sheet or array of threads of fibrous material is controlled and regulated in dependence upon the travelling speed of the material. For this purpose, the machine is provided with means which measures the travelling speed of the material and which causes the squeezing pressure to be regulated so as to maintain a value previously set by means of a displaceable pointer on a measuring instrument. Such speed-responsive pressure control means are satisfactory for many impregnating purposes.

It is an object of the present invention to provide speed-responsive pressure-regulating means which results in satisfactory regulation of the operation in cases where a change in the travelling velocity of the impregnated material is desired during the processing of the material. Such change may be necessary if the degree of drying is too high or too low, for example.

For this purpose, in accordance with one feature of my invention, I connect the setting member of the drive regulator, that controls the material travelling speed, with the means that sets the squeezing pressure at the pressure-measuring instrument. This connection operates to change the adjustment of the squeezing pressure in automatic response to variations in driving speed.

According to a more specific feature of the invention, this connection is provided preferably between the adjusting or control member for the normal operating speed, on the one hand, and the adjusting member of the drive regulator on the other hand. The connection can be effected by a direct mechanical shaft connection or by electrical, hydraulic or other remote control devices.

According to still another feature, it is particularly advantageous to interpose in this connection a variable motion transmission device which, once properly set, adjusts the correct squeeze-roller pressure at the squeeze-roller measuring device corresponding to all travelling speeds of the material, without requiring any further manual actuation. Depending upon the particular operating conditions desired, it is preferable to so design this transmission device that the adjustment of the pressure follows a desired mathematical function. Normally, a linear function is sufficient for this purpose, although more complicated functions are advantageous in special cases. Any of the conventional cams, discs or linkages employed in computers may be used to obtain direct, inverse or logarithmic correlation, for example.

Particularly suitable for the purpose of the just-mentioned transmission device is a friction-disc mechanism which comprises two conical rollers that are connected by the friction disc, the transmission ratio being varied by axial displacement of the friction disc. The interconnection between the drive regulator and the squeeze-roller pressure device employs known rotation-transmitting systems such as the selsyn system. This system comprises a transmitter having a rotating field which operates with single-phase alternating current in the excitation circuit, and is connected to the rotating-field receiver by three component current fields in the rotor circuit. The excitation can be effected by using current from the usual alternating-current power lines.

The foregoing and more specific objects, advantages and features of the invention will be apparent from the preferred embodiments illustrated on the drawing and described hereinafter. In the drawing—

Figure 2:
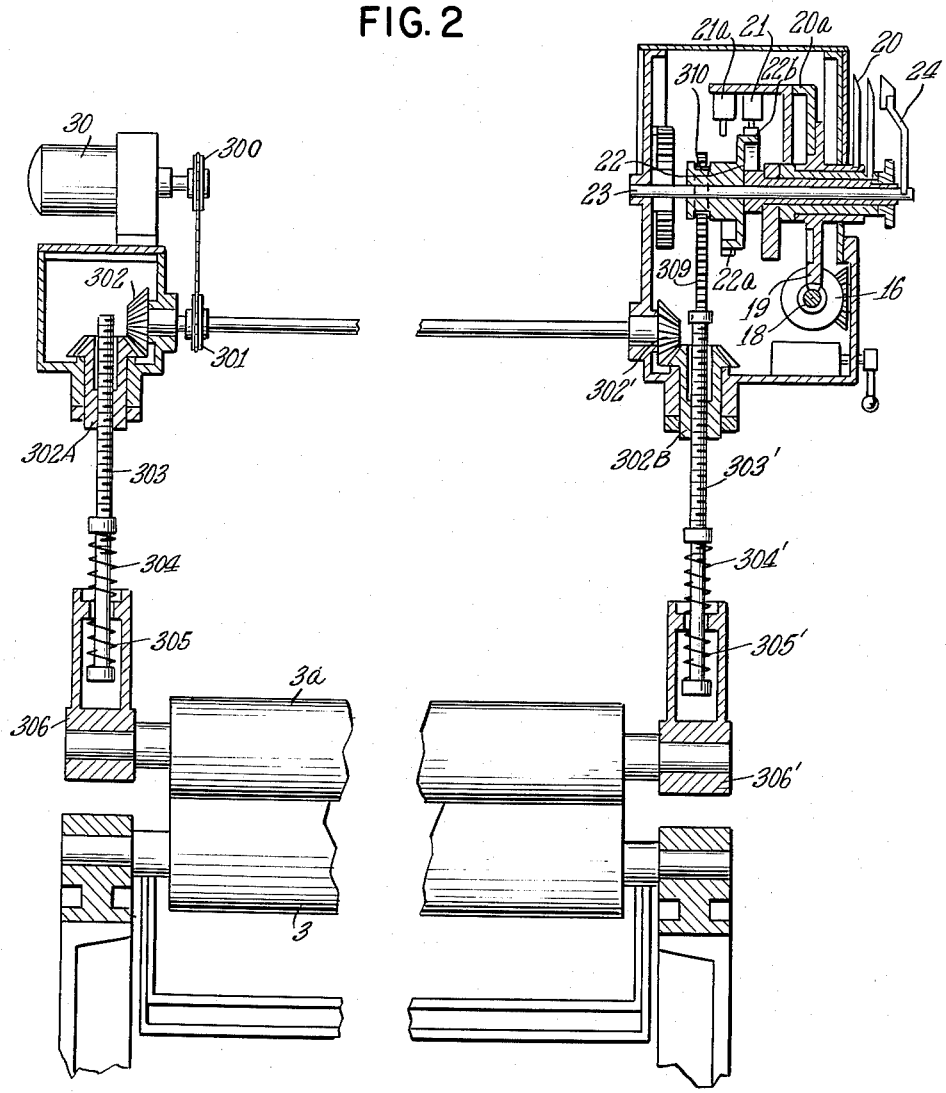
FIG. 2 is a schematic cross-sectional side view of the measuring and regulating device.
Figure 4:
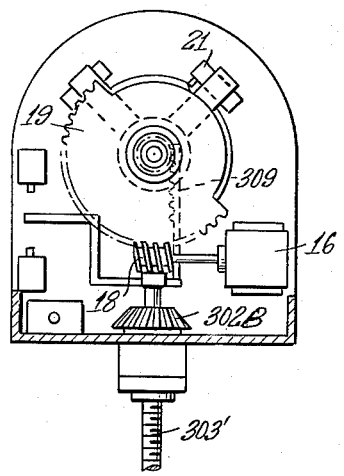
FIG. 4 is a schematic view of the interior of the measuring and regulating device, the front wall being removed.
Figure 3:
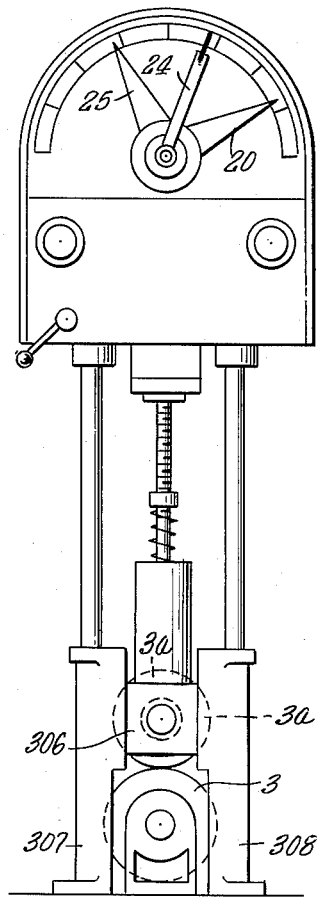
FIG. 3 is a front view of the same device.

The material to be processed, such as an array of thread or warp, a sheet material of paper or textile, passes from a supply beam 1 over a guide roller 2 under a roller 40 and between a pair of squeeze rollers 3, 3a, passing on its way through a bath of impregnating liquid 4. Thence the material W travels through a drying chamber 5 and through a three-roller feeding device 6 and is ultimately wound up upon a beam 7. The upper squeeze roller 3a is pressed toward the lower squeeze roller 3 by mechanism acting downwardly against the opposite bearing blocks 306, 306' (FIG. 2). The pressure control motor 30 sets the squeezing pressure. The motor turns sprockets 300, 301, bevel gear 302, and internally screw-threaded bevel gear 302A. This moves externally threaded spindle 303 carrying opposed compression springs 304, 305, thus applying spring pressure to bearing block 306 which is carried between standards 307, 308 (FIG. 3). Sprocket 301 also turns bevel gears 302' and 302B, causing screw spindle 303' to move up or down, thus applying pressure to opposite bearing block 306', through springs 304' and 305'. Spindle 303' carries a rack gear 309 which acts upon a pinion gear 310 fixed upon the bearing sleeve of double cam disc 22. The square shaft 23 is thereby turned. Shaft 23 carries pressure indicator 24. As is more fully described below, two rotary switches 21 and 21a, under control of the rotor of receiver 16, open and close a pole-reversing contactor indicated at 30a (FIG. 5), to control operation of pressure control motor 30, in forward or reverse direction.

The feed rollers 6 and, if desired, also the squeezing roller 3, are driven by electric motor 9 through a variable-speed V-belt transmission 8. The transmission ratio of the transmission 8 can be varied by rotary displacement of a control shaft 10. The transmission 8 is conventional. It comprises a pair of laterally adjustable V-shaped sheaves 80, 81 and a second pair 82, 83, both pairs mounting an endless belt 84. The control screw rod 10, oppositely threaded at its ends, moves the ends of connecting bars 85, 86 toward or away from each other to move the sheaves 80, 81 toward or away from each other. At the same time, it moves sheaves 82, 83 away from or toward each other. The setting of control shaft 10 is communicated to the apparatus in control of the squeezing pressure, as follows.

Connected with the control shaft 10 is a regulator drive which is composed of two conical friction rollers 11, 11A and an intermediate friction roller 11B that can be axially displaced by means of a screw spindle actuable by a hand wheel 12. The take-off shaft of the regulator drive 11 transmits its motion to a rotary-field transmitter 13 which is connected through electric leads 14, 15 with a rotary-field receiver 16. The rotary-field receiver 16 is mounted on apparatus 17. This apparatus includes the switches 21, 21a (FIG. 2) and other mechanism for regulating the squeezing pressure on the roller pair 3, 3a. When the rotor of receiver 16 is turned, it transmits its rotary movement through a worm 18 to a worm gear sector 19. Gear 19 is connected with the adjusting pointer 20 and with the contact carrier 20a (FIG. 2) for normal operation. This also causes displacement of the switches 21 and 21a which are mounted on the contact carrier 20a and which cooperate with double cam disc 22. The cam disc 22 is secured on the shaft 23 of pointer 24 which indicates the pressure actually obtaining. In all other respects, the design and operation correspond to that of the device described in the above-mentioned copending application.

Figure 5:
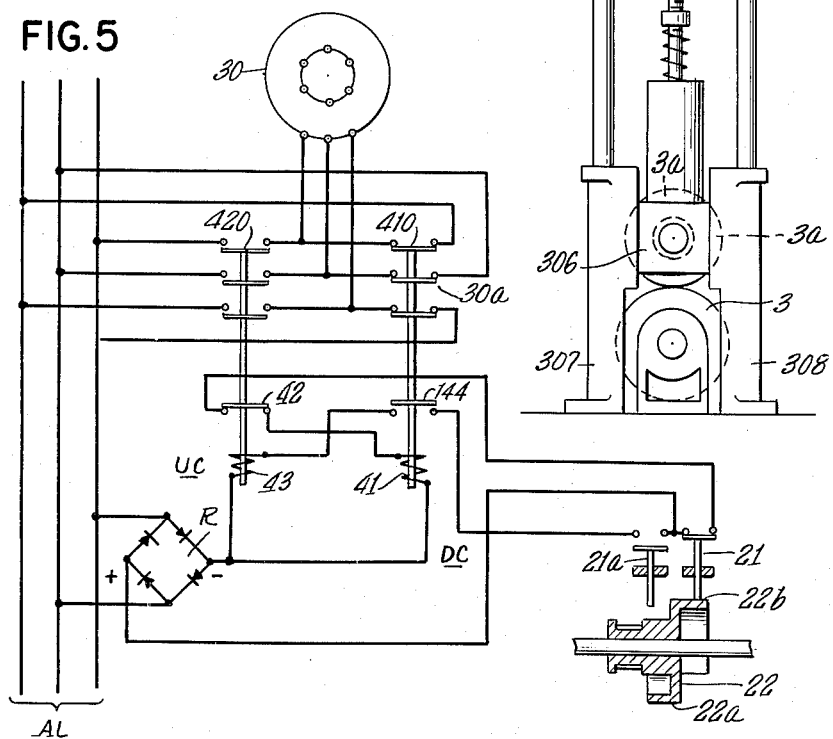
FIG. 5 is a schematic view of a circuit for operation of the motor that sets the squeezing pressure of the rollers.

FIG. 5 shows, schematically, an example of circuit connections between the switches 21, 21a and the actuator pressure control motor 30.

The pressure control motor 30, which sets the squeezing pressure, is energized from an alternating current line AL through two reversing contactors UC and DC. When contactor UC is picked up, that is, lifted to close power contacts 420, the motor 30 is energized from line AL to move the pressure control spindles 303, 303' upward, whereas when contactor DC is picked up, that is, when contacts 410 are closed, it causes the motor 30 to run the control spindles in the downward direction. The operating coil 41 of contactor DC is energized through an interlock contact 42 of contactor UC under control by the above-mentioned switch 21 which in turn is actuated by cam face 22b. The cam carrier 22 has a second cam face 22a, angularly displaced with respect to cam face 22b, for controlling a switch 21a similar to switch 21. Switch 21a, when closed, energizes the coil 43 of contactor UC through an interlock contact 44 of contactor DC. Due to the interlock contacts 42 and 44, only one of the two contactors can pick up at a time. When neither switch 21 nor 21a is closed, neither coil 41 nor coil 43 are energized. Consequently, neither power contacts 410 nor 420 are raised to closed position.

As explained above, the carrier 20a of switches 21 and 21a is rotationally displaceable about the axis of shaft 23 and, at any given moment, assumes a position corresponding to the squeezing pressure which the actuator motor 30 is to maintain substantially constant. When the squeezing pressure has this desired value, both switches 21 and 21a are open so that both contactors UC and DC are dropped off and the motor 30 is at rest. When the the squeezing pressure has this desired value, both switches as determined by the setting of the switch carrier 20a (FIG. 2), then one or the other of switches 21 and 21a is closed by the respective cams 22, 22a so that the proper contactor UC or DC is energized to make the motor 30 run in the direction required to lift or lower the pressure control spindles 303, 303' toward establishing the proper squeezing pressure. When this pressure is reached, both cam faces 22a and 22b are out of engagement with the respective switches so that the motor 30 is again at rest.

Figure 1:
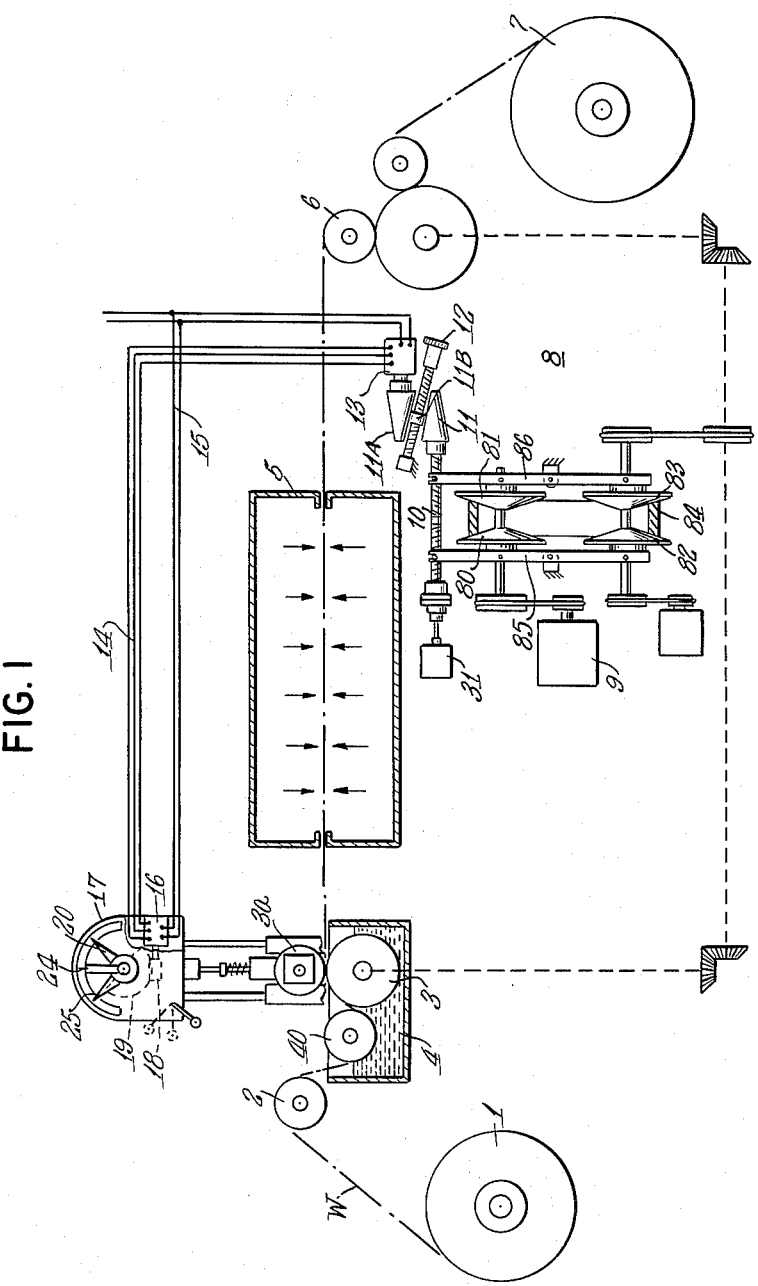
FIG. 1 illustrates, schematically, the assembled processing plant comprising warp supply and warp-receiving beams, squeezing rollers and an intermediate drying chamber.

To operate the device, the squeezing pressure is first set for a given travel speed of the material, such as the desired creeping or threading speed of the machinery. Adjustment of the squeezing pressure for this given speed is effected by setting a creeping-speed indicator 25 correspondingly in the manner described in the copending application. In addition, the hand wheel 12 (Fig. 1) is set for a given transmission ratio of the transmission gearing 8, this setting being made in dependence on the particular properties of the material to be processed, and also the particular processing to be applied to the material. If now, during the subsequent operation of the machine, the travelling speed of the material is changed, for instance when passing from creeping to normal processing speed or as a result of changes in the normal speed, then such variation is transmitted from transmission 8 through the control shaft 10 to the regulator drive 11, 11A and electrically through transmitter 13 and the leads 15 to the normal-speed indicator of the squeezing-pressure device. Consequently, the switches 21 and 21a are correspondingly displaced. As described above, the switches control the pole-reversing contactor 30a, which causes the pressure control motor 30 (FIG. 2) to set the device for a different squeezing pressure corresponding to the changed operating conditions.

During the operation of the machinery there may occur a change in the speed ratios, due to operation of a manual control, or by operation of a regulating device. Such device may act upon the speed control motor 31 (FIG. 1) in response to a given operating condition or means, such as a sensing means which determines the degree of dryness of the material, in order to regulate the travelling speed of the material correspondingly. When such change in speed conditions occurs, the regulator drive 11, 11A acts through the components 13, 14, 15, 16 to automatically actuate pressure control motor 30 to change the squeezing pressure, in accordance with the variation over normal operating speed. As a result, any change in driving conditions automatically causes a properly correlated change in squeezing pressure so that the pressure is always within the desired range required for the processing speed.

The essence of the present invention is that the pressure between the rollers 3 and 3a is regulated in dependence upon the traveling speed of the material. The speed is taken off at the V-belt transmission 8. The position of mechanism 8, corresponding to the speed, is transmitted by the rotary-field transmitter 13 to the rotary-field receiver 16 and thus also to the datum-value transmitter 20. The system constitutes an automatic control system in which the measured value represented by the position of the mechanism 8 is transmitted to the pointer 20 so that this pointer 20 assumes a position that corresponds to the travelling speed of the material W. The position of pointer 20 serves as a datum-value transmitter for the closed regulating circuit that controls the pressure between the rollers 3 and 3a. In this closed regulating circuit, the roller pressure is transmitted to the pointer 24. The position of pointer 24 (measured value or pattern value) is automatically compared with the position of the pointer 20 (datum value or pilot value), the pressure control motor 30 (FIG. 2) is automatically placed in rotation until the measured-value pointer 24 coincides with the datum-value pointer 20. Consequently, the present invention concerns itself with regulating the roller pressure automatically in accordance with a datum value that corresponds to the travelling speed of the material, the datum value being automatically adjustable to a different roller pressure when the speed of the material W changes. The type of speed adjustment is irrelevant to the invention proper in its broadest aspect. As stated above, the speed adjustment may be effected by a manual device by means of which the control motor 31 is placed in rotation in one or the other direction. However, the control may also be automatic so that the speed is changed, for example, in dependence upon the degree of moisture content. Devices for the latter automatic control are conventional.

The above-described embodiments are exemplary. The invention includes modification carrying out the described principles of operation, within the meaning of the appended claims.

I claim:

1. In a machine for coating a continuously advancing length of textile material with a coating liquid, means for supplying the coating liquid to the material, means for squeezing excess liquid from the material comprising a pair of oppositely drivable squeeze rollers adapted to have the coated material pass therebetween, means for applying variable pressure to one of the squeeze rollers in the direction of the other, means to variably control the speed of advancement of the material between the rollers, automatic means which governs the relationship of the pressure to the speed of advancement of the material, and which is operative to obtain a predetermined functional relationship between said pressure and said speed over a range of travelling speeds of the material, said means which governs including a variably settable element the setting of which determines the said functional relationship.

2. In a machine for coating a continuously advancing length of textile material with a coating liquid, means for supplying the coating liquid to the material, means for squeezing excess liquid from the material comprising a pair of oppositely drivable squeeze rollers adapted to have the coated material pass therebetween, means for applying variable pressure to one of the squeeze rollers in the direction of the other, a drier through which the material is led from the squeeze rollers, means to variably control the speed of advancement of the material between the rollers and through the drier, means which automatically governs the relationship of the pressure to the speed of advancement of the material over a range of travelling speeds of the material, to obtain a predetermined functional relationship between said pressure and said speed over a range of travelling speeds of the material.

3. In a machine for coating a continuously advancing length of textile material with a coating liquid, means for supplying the coating liquid to the material, means for squeezing excess liquid from the material comprising a pair of oppositely drivable squeeze rollers adapted to have the coated material pass therebetween, pressure means for applying variable pressure to one of the squeeze rollers in the direction of the other, speed control means to variably control the speed of advancement of the material between the rollers, means which operatively connects the said pressure means to the said speed control means including a correlating device which serves to obtain a predetermined functional relationship between said pressure and said speed, the correlating device comprising a variable speed ratio apparatus comprising two conical rollers having their conical surfaces spaced and juxtaposed, and tapering in opposite directions, an intermediate friction roller contacting the two conical surfaces, and means for setting the position of the intermediate roller to determine the said functional relationship.

4. In a machine for coating a continuously advancing length of textile material with a coating liquid, means for supplying the coating liquid to the material, means for squeezing excess liquid from the material comprising a pair of oppositely drivable squeeze rollers adapted to have the coated material pass therebetween, pressure means for applying variable pressure to one of the squeeze rollers in the direction of the other, speed control means to variably control the speed of advancement of the material between the rollers, means which operatively connects the said pressure means to the said speed control means including a correlating device which serves to obtain a predetermined functional relationship between said pressure and said speed, the correlating device comprising a variable speed ratio apparatus comprising two conical rollers having their conical surfaces spaced and juxtaposed, and tapering in opposite directions, an intermediate friction roller contacting the two conical surfaces, and means for setting the position of the intermediate roller to determine the said functional relationship, the means to variably control the speed of advancement of the material comprising a V-belt variable speed ratio device including a rotatable control element which sets the speed ratio of said device, one of said conical rollers being turned by said rotatable control element.

5. In a machine for coating a continuously advancing length of material with a coating liquid, means for supplying the coating liquid to the material, means for squeezing excess liquid from the material comprising a pair of oppositely drivable squeeze rollers adapted to have the coated material pass therebetween, pressure setting means for applying variable pressure to one of the squeeze rollers in the direction of the other, speed control means to variably control the speed of advancement of the material between the rollers, means which operatively connects the said pressure means to the said speed control means including an automatic correlating device which serves to obtain a predetermined functional relationship between said pressure and said speed over a range of travelling speeds of the material, the means for applying variable pressure including a driving element therefor, the means which operatively connects including movable switch means to control the driving element, movable actuating means for the switch means, the movement of one of said movable means being governed by the means applying variable pressure, the movement of the other movable means being governed by the means to variably control the speed of advancement.

6. In a machine for coating a continuously advancing length of textile material with a coating liquid, means for supplying the coating liquid to the material, means for squeezing excess liquid from the material comprising a pair of oppositely drivable squeeze rollers adapted to have the coated material pass therebetween, pressure setting means for applying variable pressure to one of the squeeze rollers in the direction of the other, a drier through which the material is led from the squeeze rollers, speed control means to variably control the speed of advancement of the material between the rollers and through the drier, connecting means which operatively connects the said pressure means to the said speed control means including an automatic correlating device which serves to automatically obtain a predetermined functional relationship between said pressure and said speed over a range of travelling speeds of the material, the means for applying variable pressure including a driving element therefor, the connecting means including movable switch means to control the driving element, movable actuating means for the switch means, the movement of one of said movable means being governed by the means applying variable pressure, the movement of the other movable means being governed by the means to variably control the speed of advancement.

7. In a machine for coating a continuously advancing length of material with a coating liquid, means for supplying the coating liquid to the material, means for squeezing excess liquid from the material comprising a pair of oppositely drivable squeeze rollers adapted to have the coated material pass therebetween, pressure setting means for applying variable pressure to one of the squeeze rollers in the direction of the other, a drier through which the material is led from the squeeze rollers, speed control means to variably control the speed of advancement of the material between the rollers and through the drier, automatic means operatively connected to the said pressure means to control the pressure in dependence upon travelling speed of the material including a correlating device which serves to obtain a predetermined functional relationship between said pressure and said speed over a range of travelling speeds of the material, the means for applying variable pressure including a driving element therefor, the connecting means including positionable switch means to control the driving element, positionable actuating means for the switch means, the position of one of said positionable means being governed by the means applying variable pressure, the position of the other positionable means being governed in dependence upon the speed of advancement.

8. In a machine for coating a continuously advancing length of material with a coating liquid, means for supplying the coating liquid to the material, means for squeezing excess liquid from the material comprising a pair of oppositely drivable squeeze rollers adapted to have the coated material pass therebetween, means for applying variable pressure to one of the squeeze rollers in the direction of the other, means to variably control the speed of advancement of the material between the rollers, the means for applying variable pressure to said squeeze roller comprising a control motor and movable means controlled by said motor adapted to bear resiliently against opposite ends of said one roller, a rotatable saft connected to turn in correspondence with the movement of the said movable means, a pressure indicator connected to said shaft, a cam device turned by said shaft, switch means movable about said shaft and controlling the control motor, the opening and closing of the switch means being governed by the cam device, the angular position of the switch means with respect to the cam device being governed by means operatively connected to the means employed to variably control the speed of advancement of the material.

9. In a machine for coating a continuously advancing length of material with a coating liquid, means for supplying the coating liquid to the material, means for squeezing excess liquid from the material comprising a pair of oppositely drivable squeeze rollers adapted to have the coated material pass therebetween, means for applying variable pressure to one of the squeeze rollers in the direction of the other, means to variably control the speed of advancement of the material between the rollers, means connected to operate in dependence upon the speed of advancement of the material, the means for applying variable pressure to said squeeze roller comprising a control motor and movable means controlled by said motor adapted to bear resiliently against opposite ends of said one roller, a rotatable shaft connected to turn in correspondence with the movement of the said movable means, a cam device turned by said shaft, two switch means movable about said shaft and controlling the forward and reverse operation of the control motor, the cam device having two angularly displaced cam surfaces, the opening and closing of the switch means being governed by the cam surfaces, the angular position of the switch means with respect to the cam surfaces being governed by the means connected to operate in dependence upon the speed of advancement of the material.

10. In a machine for coating a continuously advancing length of material with a coating liquid, means for supplying the coating liquid to the material, means for squeezing excess liquid from the material comprising a pair of oppositely drivable squeeze rollers adapted to have the coated material pass therebetween, means for applying variable pressure to one of the squeeze rollers in the direction of the other, a drier through which the material is led from the squeeze rollers, means to variably control the speed of advancement of the material between the rollers and through the drier, means connected to operate in dependence upon the speed of advancement of the material, the means for applying variable pressure to said squeeze roller comprising a control motor and movable means controlled by said motor adapted to bear resiliently against opposite ends of said one roller, a rotatable shaft connected to turn in correspondence with the movement of the said movable means, a pressure indicator connected to said shaft, a cam device turned by said shaft, switch means movable about said shaft and controlling the control motor, the opening and closing of the switch means being governed by the cam device, the angular position of the switch means with respect to the cam device being governed by the means connected to operate in dependence upon the speed of advancement of the material.

11. In a machine for coating a continuously advancing length of material with a coating liquid, means for supplying the coating liquid to the material, means for squeezing excess liquid from the material comprising a pair of oppositely drivable squeeze rollers adapted to have the coated material pass therebetween, means for applying variable pressure to one of the squeeze rollers in the direction of the other, means to variably control the speed of advancement of the material between the rollers, the means for applying variable pressure to said squeeze roller comprising a control motor, movable means controlled by said motor adapted to bear resiliently against opposite ends of said one roller, a rotatable shaft connected to turn in correspondence with the movement of the said movable means, a pressure indicator connected to said shaft, a cam device turned by said shaft, switch means movable about said shaft and controlling the control motor, the opening and closing of the switch means being governed by the cam device, means operatively connected to the means employed to variably control the speed of advancement of the material, the means operatively connected comprising a device for setting and predetermining a functional relationship between the speed of advancement and the squeeze roller pressure, the angular position of the switch means with respect to the cam device being governed by the device setting.

12. In a machine for coating a continuously advancing length of material with a coating liquid, means for supplying the coating liquid to the material, means for squeezing excess liquid from the material comprising a pair of oppositely drivable squeeze rollers adapted to have the coated material pass therebetween, means for applying variable pressure to one of the squeeze rollers in the direction of the other, a drier through which the material is led from the squeeze rollers, means to variably control the speed of advancement of the material between the rollers and through the drier, the means for applying variable pressure to said squeeze roller comprising a control motor, movable means controlled by said motor adapted to bear resiliently against opposite ends of said one roller, a rotatable shaft connected to turn in correspondence with the movement of the said movable means, a pressure indicator connected to said shaft, a cam device turned by said shaft, switch means movable about said shaft and controlling the control motor, the opening and closing of the switch means being governed by the cam device, the angular position of the switch means with respect to the cam device being governed by means operatively connected to the means employed to variably control the speed of advancement of the material, the means operatively connected comprising a device for setting and predetermining a functional relationship between the speed of advancement and the squeeze roller pressure.

13. In a machine for coating a continuously advancing length of textile material with a coating liquid, means for supplying the coating liquid to the material, said means including a vessel for the liquid and a roller at least partly submerged therein and under which the textile material passes, means for squeezing excess liquid from the material comprising a pair of oppositely drivable squeeze rollers adapted to have the coated material pass therebetween, means for applying variable pressure to one of the squeeze rollers in the direction of the other, means to variably control the speed of advancement of the material between the rollers, means which controls said means for applying variable pressure and automatically governs the relationship of the pressure to the speed of advancement of the material over a range of travelling speeds of the material, and operative to automatically obtain a predetermined functional relationship between said pressure and said speed over such range.

14. In a machine for coating a continuously advancing length of textile material with a coating liquid, means for supplying the coating liquid to the material, means for squeezing excess liquid from the material comprising a pair of oppositely rotated squeeze rollers adapted to have the coated material pass therebetween, means for applying variable pressure to one of the squeeze rollers in the direction of the other, means to variably control the speed of advancement of the material between the rollers, a device which regulates said means for applying variable pressure in dependence upon the speed of advancement and governs the relationship of the pressure to the speed of advancement of the material over a range of travelling speeds of the material, and is operative to automatically obtain a predetermined relationship between said pressure and said speed over said range.

References Cited in the file of this patent

UNITED STATES PATENTS

| | | |
|---|---|---|
| 1,289,912 | Riely | Dec. 31, 1918 |
| 1,603,976 | Nicholls | Oct. 19, 1926 |
| 1,663,232 | Ambler | Mar. 20, 1928 |
| 2,365,621 | Bender | Dec. 19, 1944 |
| 2,614,522 | Snyder | Oct. 21, 1952 |
| 2,670,708 | Kolberkemp | Mar. 2, 1954 |
| 2,674,222 | Messinger | Apr. 6, 1954 |
| 2,744,492 | Engmann | May 8, 1956 |
| 2,797,171 | Frolich | June 25, 1957 |